ns
3,142,122
MAGNETIC INSTRUMENT
Otto Hartwig Boepple, Carmel, N.Y., assignor to Kenyon Instrument Co. Inc., Brewster, N.Y., a corporation of New York
Filed Jan. 26, 1962, Ser. No. 168,898
1 Claim. (Cl. 33—222)

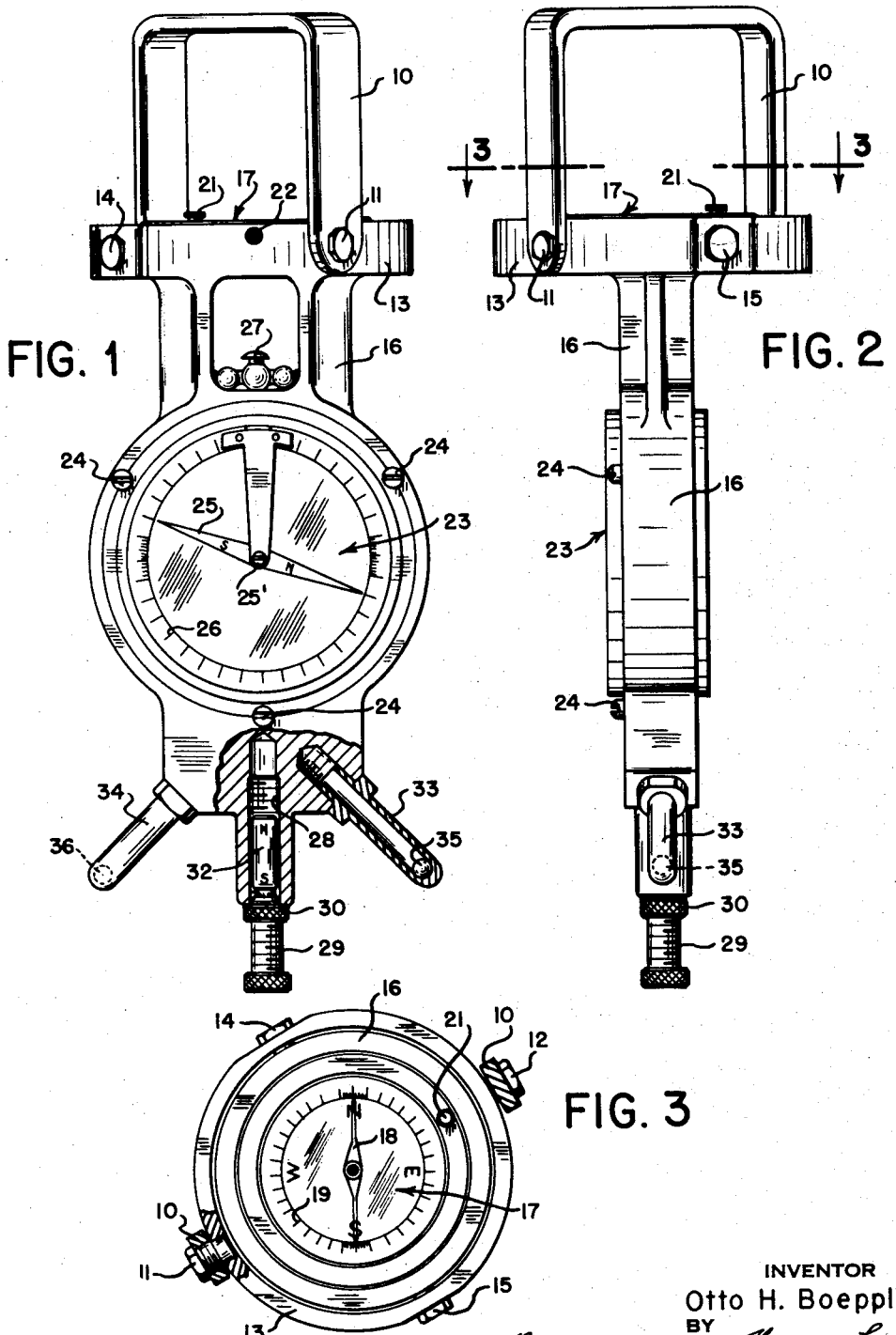

This invention relates to magnetic instruments of the dip needle type for obtaining information concerning the size, character, location etc. of underground materials differing in permeability from surrounding matter. In particular, it relates to a compact portable dip needle instrument designed especially for rapid and accurate use in the field.

Dip needle indicators have been used to record variations in the earth's magnetic field and also to determine to some extent the nature and location of underground deposits. Such instruments consist essentially of magnetic compass and dip needles arranged respectively in horizontal and vertical planes and some means for introducing controlled change to the dip needle reading. In use, the common practice is to align the dip needle vertically in a north-south direction so that it is isolated from all magnetic moments not in its plane of rotation and then apply several equal and opposite forces to it by counterweights or magnets. After the dip needle is thus stabilized by these opposed forces, it is displaced from its rest position a predetermined amount. When the instrument is thereafter moved to a location where the earth's magnetic field is different, the change will be indicated by the departure of the dip needle from this predetermined displaced position.

Heretofore, magnetic devices of this type have been highly delicate and cumbersome apparatus, often set up on a tripod in the exacting manner of a surveyor's instrument. In most cases, electric circuitry is relied upon to activate fine electromagnets that provide the counterbalancing or displacement forces or both acting on the dip needle. It has also been conventional to pivot the dip needle about a point above its center of gravity so that gravitational forces tend to return it to a state of stabile equilibrium. Because of these and other refinements, instruments of satisfactory sensitivity for professional prospecting have been tantamount to laboratory devices which do not lend themselves at all well to field conditions. A multiplicity of readings must be taken on a grid system over a given area to obtain suitable information and more often than not the terrain is rough and the footing difficult. Under these circumstances, the known type of dip needle instrument, delicate, cumbersome and difficult to set up, has been distinctly unsatisfactory for rapid and accurate professional field work.

It is the purpose of the present invention to provide a portable magnetic dip needle indicator which can be set up and read in seconds at various locations almost without regard to the ruggedness of the terrain and with a degree of accuracy which is superior or at least equal to that of known laboratory type devices. Since the elements of conventional dip needle instruments rendering them cumbersome and easily damaged are the very ones which also insure their accuracy, the present invention has as a further purpose the provision of new and different means for obtaining satisfactory accuracy without appreciable addition to size, weight and delicacy.

The new portable magnetic instrument for obtaining information concerning underground materials and the like comprises a supporting element and a free-hanging frame attached to and adapted to be suspended plumb from the supporting element. A compass is located on the frame in a horizontal plane when the frame is plumb. A magnetic dip needle is pivoted relative to the frame, preferably at the needle's center of gravity, to swing in a vertical plane when the frame is plumb. An adjustable magnet is located on the frame and is movable along a line extending through the dip needle pivot point vertically when the frame is plumb. Magnetizable means are located on the frame to amplify the magnetic effect on the dip needle of the underground materials.

One of the major improvements in this instrument is the last-mentioned magnetizable means, which may be a pair of steel balls fixed relative to the preferably non-magnetizable frame with their centers spaced equally on opposite sides of the adjustment magnet in the plane of swing of the dip needle and equidistant from the dip needle pivot point. It has been discovered that these steel balls amplify the ambient magnetic field affecting the dip needle reading, thus contributing considerable "gain" to the dip needle displacement and substantially increasing the accuracy of the readings. Because of this increase in accuracy and sensitivity, it is possible to do away with many of the unwieldy and delicate features in known magnetic instruments which have made them inappropriate for intensive field use.

Along with this improvement, it has been discovered that a departure from the standard manner of pivoting the dip needle is highly beneficial. In the new indicator, the needle is pivoted exactly at its center of gravity rather than at a point above it. As a result, the dip needle is isolated from all gravitational moments and is influenced solely by the adjustable magnet and the ambient magnetic field, all without reliance upon intricate counterweight or magnetic opposed forces previously used to stabilize the needle.

These advances embodied in the present invention make possible an instrument of the utmost simplicity which possesses exceptional accuracy. In use, it is merely held in the operator's hand by the supporting element at the point where a reading is to be taken, turned manually so that the free-hanging frame aligns the dip needle in a north-south direction, and then observed for a rapid determination of the dip needle displacement at that point. No involved setting-up procedure is required nor is it at all difficult to carry the new light-weight device from one station to the next in the field. Thus, accurate readings can be taken over expansive tracts of land at closely spaced coordinate points in far less time than was ever possible heretofore.

A preferred embodiment of this invention is described hereinbelow with reference to the accompanying drawing, wherein:

FIG. 1 is a front elevation partly broken away and in section of the new magnetic instrument;

FIG. 2 is a side elevation taken from FIG. 1; and

FIG. 3 is a section partly broken away taken along the line 3—3 of FIG. 2.

A U-shaped handle 10 is pivoted by bolts 11 and 12 at its opposite ends to a gimbal ring 13. Ninety degrees removed from the bolts 11 and 12 on the gimbal ring are two additional bolts 14 and 15 which extend in threaded engagement through the ring into pivotal engagement with a depending frame 16, shown generally in FIGS. 1 and 2. This universal gimballed attachment between the handle 10 and the frame 16 permits the latter unlimited degrees of angular motion and allows it to be suspended plumb at all times when only the handle is grasped by the user.

The topmost portion of the frame 16 is formed with a circular seat into which is fitted a compass assembly 17 disposed precisely in a horizontal plane when the frame 16 is plumb. As shown in FIG. 3, the compass 17 includes the usual magnetized needle 18, a suitably numbered circumferential scale 19, and a needle lock 21 by which the needle 18 may be held in fixed position when the instrument is not in use. A removable cover may be provided over the compass assembly 17 to protect against damage and the entire assembly may be taken from its seat by loosening a set screw 22 appearing in FIG. 1.

The portion of the frame 16 beneath the compass assembly 17 forms a second circular seat which receives a dip needle assembly 23 disposed precisely perpendicular to the plane of the compass assembly 17. Thus, when the frame is freely suspended and the compass assembly 17 is horizontal, the plane of the dip needle assembly 23 is exactly vertical. In addition, this plane of the assembly 23 is displaced about thirty degrees from the common axis of the bolts 14 and 15. The dip needle assembly 23 is removably attached in its circular seat by means of lock screws 24, and it includes a magnetized dip needle 25, a circumferential scale 26 suitably marked in degrees, and a lock 27 adapted to hold the dip needle 25 in place when the instrument is not in use. Again, a cover may be provided for the face of the dip needle assembly 23 for purposes of protection. Some means for adjusting the scale 26 may also be provided if desired.

It is important to note that the magnetized dip needle 25 is pivoted at 25' precisely at its center of gravity. As a result, gravitational forces can impose no unbalanced turning moment on it in use regardless of its angular position.

At the lowermost portion of the frame 16 is a threaded bore 28 extending upwardly toward the pivot point of the dip needle 25. An adjusting screw 29 is threaded into this bore 28 and may be held in any given position by a lock nut 30. The inwardly projecting end of the adjusting screw 29 is attached to a permanent biasing magnet 32, which is shown with its north pole directed toward the dip needle 25. By turning the adjustment screw 29, the magnet 32 may be moved toward or away from the dip needle 25 along an axis which extends through the dip needle pivot point 25' and is vertical when the frame 16 is plumb.

Also, attached to the lower end of the frame 16 is a pair of pole supports 33 and 34 which are affixed permanently and project outwardly and downwardly in the plane of the dip needle assembly 23 at angles of forty-five degrees with respect to the axis of travel of the magnet 32. The pole supports 33 and 34 are hollow and at their outer ends contain magnetizable pole pieces 35 and 36 respectively which are preferably a pair of steel balls. Thus, the pole pieces 35 and 36 are fixed relative to the frame with their centers spaced equally on opposite sides of the biasing magnet 32 in the plane of swing of the dip needle 25 and equidistant from the dip needle pivot point 25'.

But for the permeable pole pieces 35 and 36, biasing magnet 32, and the magnetized needles 18 and 25, substantially all parts of this instrument are of non-permeable, i.e. non-magnetizable, material. For example, the handle 10, ring 13, frame 16, and pole supports 33 and 34 may be of aluminum or alloy thereof. Brass or bronze is a suitable material for the various bolts, set screws, and other small parts. In a typical form of the instrument, it may be approximately fourteen inches long and five inches wide when assembled and may weigh not more than about three pounds. It is sturdy but compact and of light weight, and is easily carried about by prospectors on rugged terrain.

In use, the instrument is held by the handle 10 and both needle locks 21 and 27 are released. The compass needle 18 will thus align itself parallel to the magnetic lines of force at that location and the entire frame 16 is then rotated by the handle 10 until the north and south marks on the scale 19 of the compass assembly 17 register with the position of the needle 18. When this is done, the plane of swing of the dip needle 25 is precisely vertical. Hence, the dip needle 25 is isolated from all horizontal components of the earth's magnetic field and its jeweled bearings at the pivot point 25' are free of all moments not in its plane of swing. This allows the dip needle 25 to turn freely to align itself with the angle of declination of the magnetic field at that given location. It is important to note that this displacement of the dip needle 25 is also totally isolated from any gravitational forces since it is pivoted exactly at its center of gravity. Regardless of the angular position of the needle 25, the gravitational moments acting upon it are precisely opposed and cancel out.

It is also of considerable significance that this displacement of the dip needle 25 is especially sensitive and accurate because of the amplifying effect by the pole pieces 35 and 36 on the ambient magnetic field. These permeable pole pieces become somewhat magnetized under the influence of the earth's magnetic field and themselves create lines of force which introduce "gain" in the dip needle displacement. For example, if a body of metallic ore was located underground somewhere off in the direction in the pole piece 36, that body would magnetize the proximate pole piece 36 somewhat more than it would the remote pole piece 35. As a result, the dip needle 25 would swing substantially further toward the direction of the underground body than it would if the pole pieces were not present. In a sense, the symmetrically arranged pole pieces compound the intensity of any magnetic influences on either side of the instrument at a given location and cause the dip needle to respond to a considerably greater degree than it would if the pole pieces were absent.

An illustration of the operation of this instrument in a search for water deposits is as follows: With the frame 16 suspended plumb by the handle 10 and the needle locks 21 and 27 released, the instrument is rotated as described above until the compass needle 18 registers with "north" on the scale 19. The biasing magnet 32 is then adjusted inwardly or outwardly until the dip needle 25 takes a position of twenty degrees deflection from the horizontal. The biasing magnet 32 is then held fast by means of the lock nut 30 and is not changed in position throughout the subsequent series of readings. Readings are then taken at points approximately ten feet apart on coordinates covering the entire tract. At each point, the dip needle 25 will read more or less than twenty degrees depending upon the intensity of permeable underground deposits, if any, disrupting the local magnetic field. As noted above, these readings are amplified by the permeable pole pieces 35 and 36.

By plotting all the readings, isomagnetic lines connecting the points of highest declination are ascertained and the region where these lines are spaced closest is the most suitable site on that tract to drill for water. An estimation of the depth of the water deposit may be made by taking readings along a traverse line perpendicular to the isomagnetic line of highest declination and multiplying the distance out along that traverse line to the nearest point of minimum constant readings by a certain constant which is empirically predetermined. Some information as to the nature of the underground water may also be determined by noting whether the compass needle 18 rests quietly or tremors slightly.

In locating oil or gas deposits, much the same method may be used except that an isomagnetic line of minimum declination is plotted since that indicates subsurface voids which are characteristic of the hollow domes over most oil and gas deposits. Minerals may also be located with the instrument by turning the plane of the dip needle assembly 23 one-hundred and eighty degrees away from the north-south direction as indicated by the compass assembly 17. This will cause substantial additional displacement of the dip needle 25 and lines of maximum declination should be plotted.

It was noted before that the biasing magnet 32 is disposed with its north pole directed toward the dip needle 25. This illustrates the arrangement when the instrument is to be used in the northern hemisphere since there the north-seeking pole of the needle inclines below the horizontal and should be repelled by the magnet 32. For use in the southern hemisphere where the south-seeking pole of the dip needle 25 inclines below the horizontal, the magnet 32 should be removed from its adjusting screw 29 and replaced with its south pole uppermost. The mode of use is thereafter the same except that readings will be taken on the south side of the dip needle scale 26.

From the above discussion it is apparent that a great multiplicity of readings must often be taken with a dip needle instrument to obtain adequate information concerning underground materials in a given area. This being the case, it has been extremely impractical to use conventional, cumbersome and delicate laboratory type dip needle instruments when so many set-ups of the device are required over terrain which is often extremely rugged. The present invention provides a new and distinctly superior magnetic instrument for this type of prospecting because its unique manner of mounting the dip needle 25 precisely at the center of gravity and of amplifying the effect of the ambient magnetic field by means of the pole pieces 35 and 36 permit the device to be made vastly lighter, smaller and sturdier and yet equal or even greater in accuracy than the intricate instruments heretofore available.

I claim:

A portable magnetic instrument for obtaining information concerning underground materials and the like comprising:

(a) a supporting handle of non-magnetizable material adapted to be grasped manually, (b) a free-hanging frame of non-magnetizable material gimballed to said handle to be suspended plumb relative thereto, (c) a magnetic compass attached to said frame adjacent said handle in a horizontal plane when said frame is plumb, (d) a magnetic dip needle assembly mounted on said frame beneath said magnetic compass when the frame is plumb, said assembly including a dip needle pivoted at its center of gravity to swing in a vertical plane isolated from gravitational forces when the frame is plumb, (e) locking means for selectively holding said dip needle in a given position.

(f) a permanent biasing magnet adjustably mounted in said frame along that axis which extends through the dip needle pivot point and is vertical when the frame is plumb, (g) means for locking said magnet in a given position along said axis, and (h) means for amplifying the magnetic effect on said dip needle of said underground materials comprising a pair of magnetizable balls fixed relative to said frame with their centers spaced equally on opposite sides of said biasing magnet in the plane of swing of said dip needle and equidistant from the dip needle pivot point.

References Cited in the file of this patent

UNITED STATES PATENTS

| | | |
|---|---|---|
| 108,555 | Blomgren | Oct. 25, 1870 |
| 887,140 | Stedman | May 12, 1908 |
| 1,947,809 | Sprengnether | Feb. 20, 1934 |
| 2,487,047 | Farnham | Nov. 8, 1949 |
| 2,504,778 | Young | Apr. 18, 1950 |
| 2,508,386 | Hart | May 23, 1950 |
| 2,556,199 | Lee | June 12, 1951 |
| 2,566,098 | Van Dijck | Aug. 28, 1951 |
| 3,024,412 | Breen | Mar. 6, 1962 |

FOREIGN PATENTS

| | | |
|---|---|---|
| 13,176 | Great Britain | July 17, 1850 |
| 516,717 | Germany | Jan. 26, 1931 |